US012274992B2

(12) United States Patent
Iwao et al.

(10) Patent No.: US 12,274,992 B2
(45) Date of Patent: Apr. 15, 2025

(54) STIRRING APPARATUS FOR BOILED NOODLES

(71) Applicant: Sodick Co., Ltd., Kanagawa (JP)

(72) Inventors: Kenichi Iwao, Kanagawa (JP); Masato Taniguchi, Kanagawa (JP); Maiko Doda, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 806 days.

(21) Appl. No.: 17/509,057

(22) Filed: Oct. 24, 2021

(65) Prior Publication Data

US 2022/0258106 A1   Aug. 18, 2022

(30) Foreign Application Priority Data

Feb. 15, 2021 (JP) .................................. 2021-021747

(51) Int. Cl.
   *B01F 9/02* (2006.01)
   *A21C 15/00* (2006.01)
   (Continued)

(52) U.S. Cl.
   CPC ............ *B01F 29/61* (2022.01); *A21C 15/002* (2013.01); *B01F 35/1453* (2022.01); *B01F 2101/06* (2022.01); *B01F 2215/0422* (2013.01)

(58) Field of Classification Search
   CPC ... A21C 15/002; A21C 15/00; B01F 35/1453; B01F 2101/06; B01F 2215/0422; B01F 29/10; A23P 20/11; A23P 20/15; A23P 30/00; B08B 3/02; A23L 7/109; A23L 5/13
   See application file for complete search history.

(56) References Cited

U.S. PATENT DOCUMENTS

2011/0186084 A1*   8/2011   Milroy ................... B08B 9/093
                                                134/22.18

FOREIGN PATENT DOCUMENTS

JP       3260136           2/2002
JP       3260136 B1 *      2/2002   ............... A23L 1/16
         (Continued)

OTHER PUBLICATIONS

Machine translation of JP 2003009796 A1 performed on Sep. 5, 2024, Shinohara et al. (Year: 2003).*

(Continued)

*Primary Examiner* — Dana Ross
*Assistant Examiner* — Kevin Guanhua Wen
(74) *Attorney, Agent, or Firm* — JCIPRNET

(57) ABSTRACT

A stirring apparatus includes a bed, a column, a revolution shaft, a revolution driving device, a support member, and a stirring unit. The revolution shaft is supported by the column and extends in a horizontal direction. The revolution driving device rotates the revolution shaft about a first center line being an axis of the revolution shaft. The support member is fixed to the revolution shaft. The stirring unit includes cups and a self-rotation mechanism. The cups are disposed on a circumference centered on the first center line via the support member. The self-rotation mechanism rotates the cups about a second center line passing through a center of the cups. The cups is provided in an inclined manner so that a perpendicular from the center of a bottom plate to the first center line is shorter than a perpendicular from the center of an opening to the first center line.

8 Claims, 7 Drawing Sheets

(51) Int. Cl.
B01F 29/60 (2022.01)
B01F 35/10 (2022.01)
B01F 101/06 (2022.01)

(56) References Cited

FOREIGN PATENT DOCUMENTS

| | | | |
|---|---|---|---|
| JP | 2003009794 | 1/2003 | |
| JP | 2003009795 | 1/2003 | |
| JP | 2003009796 | 1/2003 | |
| JP | 2003009796 A1 * | 1/2003 | ............... A23L 1/16 |
| JP | 3494632 | 2/2004 | |
| JP | 2017185463 | 10/2017 | |
| KR | 20200130655 A1 * | 11/2020 | ............ B01F 27/706 |

OTHER PUBLICATIONS

Machine translation of JP 3260136 B1 performed on Sep. 5, 2024, Yasumasa (Year: 2002).*
Machine translation of KR 20200130655 A1 performed on Sep. 5, 2024, Cocchi et al. (Year: 2020).*

* cited by examiner

STIRRING APPARATUS FOR BOILED NOODLES

CROSS-REFERENCE TO RELATED APPLICATION

This application claims the priority benefit of Japan application serial No. 2021-021747, filed on Feb. 15, 2021. The entirety of the above-mentioned patent application is hereby incorporated by reference herein and made a part of this specification.

BACKGROUND

Technical Field

The disclosure relates to a stirring apparatus for boiled noodles.

Related Art

For example, when packaging boiled noodles in a product container, in order to prevent the boiled noodles from solidifying into lumps, it is desirable to sprinkle the boiled noodles with a loosening agent made of water, edible oils and fats or the like in advance. Therefore, there is known a stirring apparatus for boiled noodles, which sprays the loosening agent on the boiled noodles, followed by stirring the boiled noodles to cause the loosening agent to adhere uniformly to the boiled noodles.

In the stirring apparatuses for boiled noodles shown in Japanese Patent No. 3260136 and Japanese Patent No. 3494632, multiple cups into which the boiled noodles and the loosening agent are fed are provided vertically to a support plate disposed in an inclined manner. The cups are positioned by rotating the support plate. Then, by rotating the cups, the boiled noodles and the loosening agent are stirred and mixed together. After stirring, the cups are positioned in a predetermined discharge position, and the boiled noodles to which the loosening agent adheres are discharged outside the apparatuses.

In a conventional stirring apparatus for boiled noodles, since the support plate is disposed in an inclined manner and a revolution shaft that rotates the support plate is connected vertically to the inclined support plate, the device is relatively large in the inclination direction.

Since the cups are disposed so as to always open upward, after the cups are positioned in the discharge position, it is necessary to perform an inverting operation for directing the opening of the cups downward. Hence, a mechanism for inverting the cups is required.

SUMMARY

According to the disclosure, provided is a stirring apparatus for boiled noodles, including a bed; a column, erected on the bed; a revolution shaft, axially supported by the column and extending in a horizontal direction; a revolution driving device, having a first actuator and rotating the revolution shaft every predetermined angle about a first center line being an axis of the revolution shaft; a support member, fixed to the revolution shaft and rotating about the revolution shaft; and at least one stirring unit, stirring and discharging boiled noodles supplied thereto. The at least one stirring unit includes multiple cups and a self-rotation mechanism. The cups have a bottom plate, a side plate surrounding a periphery of the bottom plate, and an opening formed at an upper end of the side plate. The cups are disposed evenly every the predetermined angle on a circumference centered on the first center line, and are attached to the support member. The self-rotation mechanism has a second actuator and rotates each of the cups about a second center line passing through a center of the bottom plate and a center of the opening. Each of the cups is provided in an inclined manner so that a perpendicular from the center of the bottom plate to the first center line is shorter than a perpendicular from the center of the opening to the first center line.

DESCRIPTION OF THE EMBODIMENTS

The disclosure provides a stirring apparatus for boiled noodles that has a relatively simple and compact configuration.

In a stirring apparatus for boiled noodles according to the disclosure, a support member on which multiple cups are provided is rotated by a revolution shaft extending in a horizontal direction. The revolution shaft is rotated about a first center line being an axis of the revolution shaft. Each of the cups is provided in an inclined manner so that a perpendicular from the center of a bottom plate to the first center line is shorter than a perpendicular from the center of an opening to the first center line. Hence, when the cups are positioned downward, their opening naturally faces downward, and there is no need to invert the cups upon discharging the boiled noodles. Therefore, a mechanism for the inverting operation is unnecessary. In addition, the apparatus can be provided with a relatively compact configuration.

Embodiments of the disclosure are described below using drawings. The various modifications described below can be implemented in any combination.

Noodles as mentioned in the present specification generally refer to foods formed by kneading edible flour with water or the like, and include udon noodles, buckwheat noodles, somen noodles, hiyamugi noodles, Chinese noodles, pastas, rice noodles, harusame noodles. That is, the noodles as mentioned in the present specification include noodles other than those using edible flour other than wheat flour as a main raw material. Boiled noodles are noodles that have been boiled before being supplied to a stirring apparatus for boiled noodles. A material to be mixed with the boiled noodles in the stirring apparatus for boiled noodles is broadly referred to as a mixed material, and the mixed material includes a material other than a loosening agent. Specifically, the mixed material includes water, edible oils and fats, seasonings and condiments (including spices, herbs and relishes), sauces (including those having solid matter), and food additives.

Figure 1:
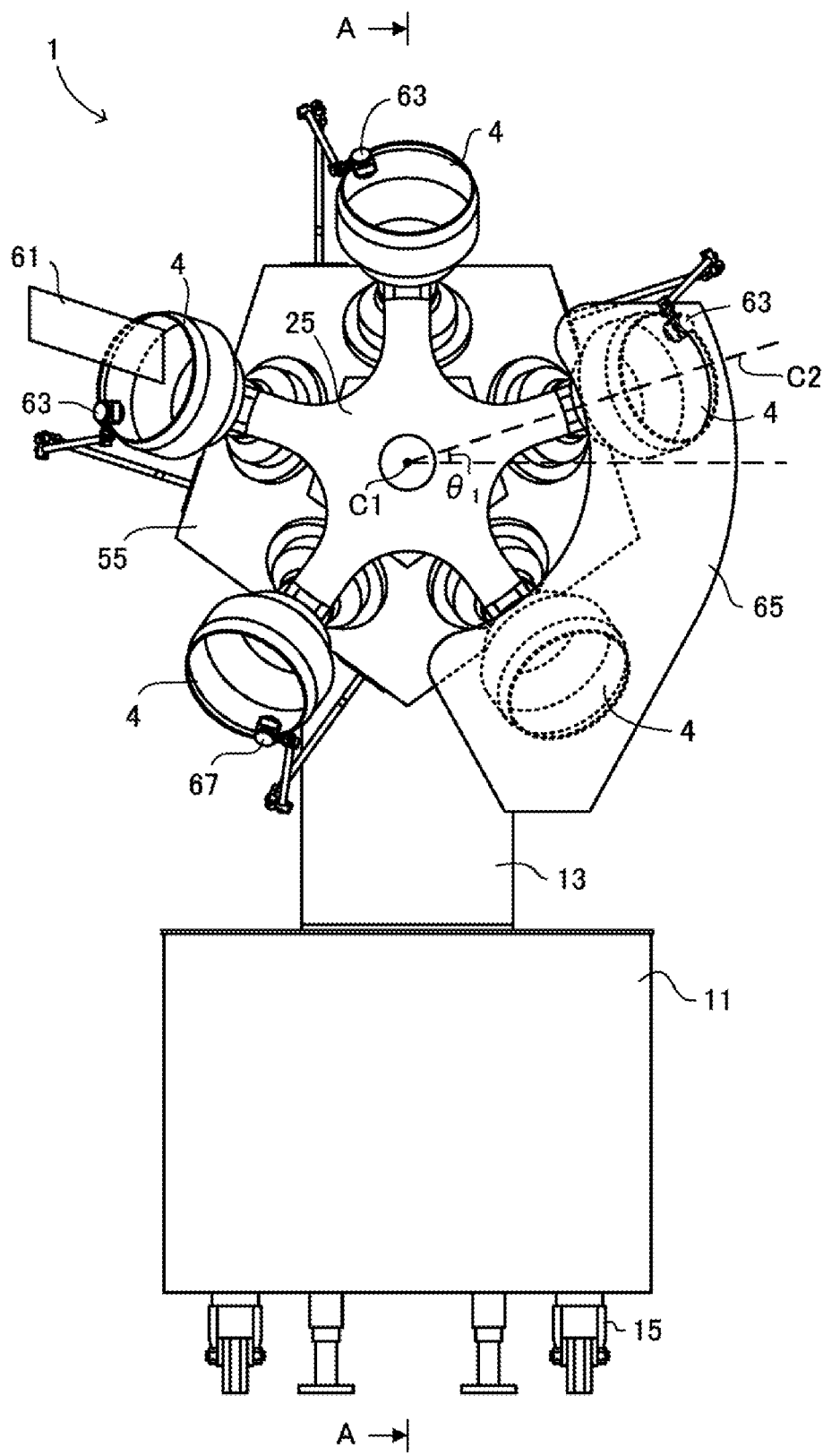
FIG. 1 is a front view of a stirring apparatus for boiled noodles according to a first embodiment.
Figure 2:
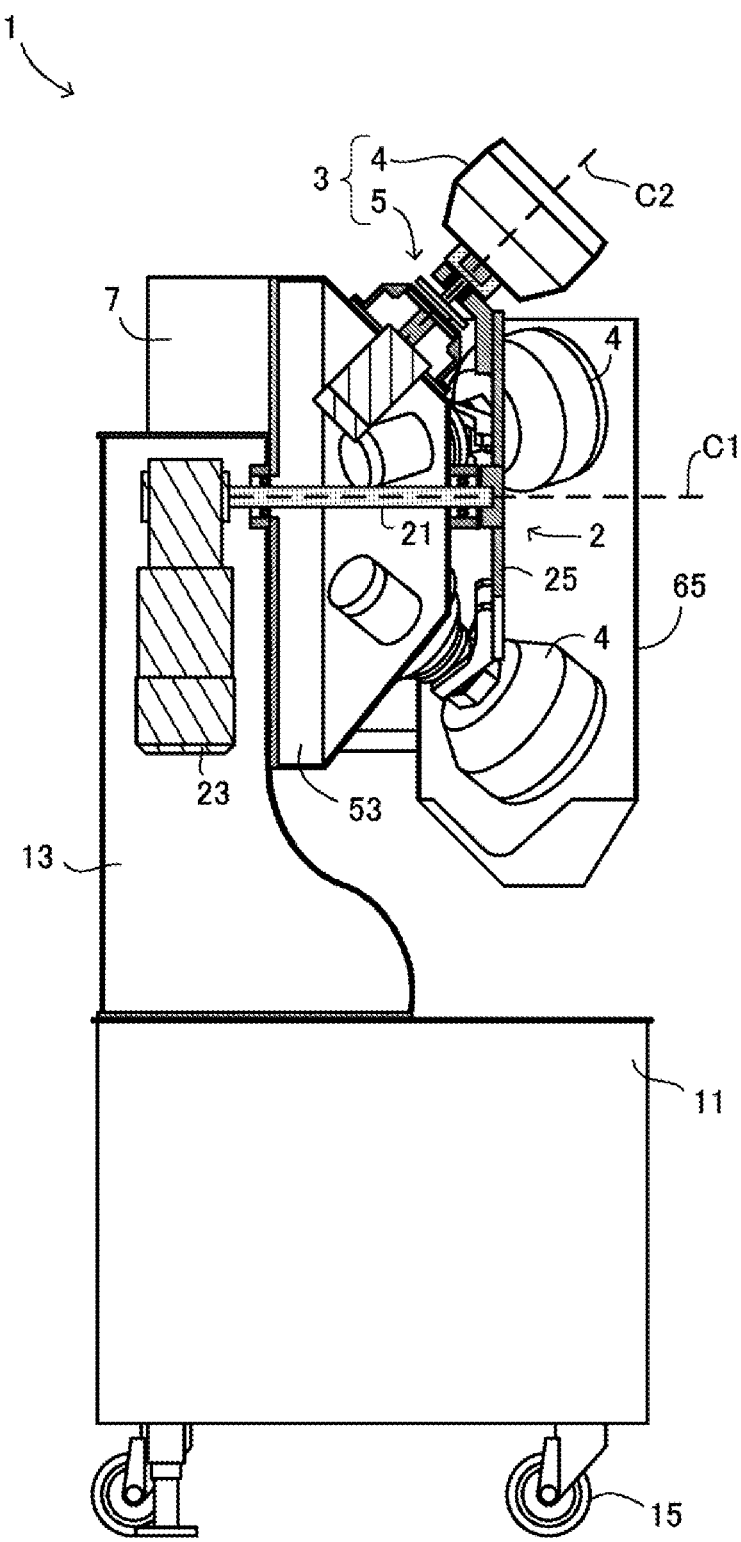
FIG. 2 is a cross-sectional view taken along A-A in FIG. 1.

FIG. 1 and FIG. 2 illustrate a stirring apparatus for boiled noodles 1 according to a first embodiment. The stirring apparatus for boiled noodles 1 includes a bed 11, a column 13, a revolution mechanism 2, a stirring unit 3, a supply chute 61, a material nozzle 63, a discharge chute 65, a cleaning nozzle 67, and a controller 7.

The column 13 is erected on the bed 11 that serves as a base. In the case where the stirring apparatus for boiled noodles 1 is configured to be movable, casters 15 are provided on a lower surface of the bed 11.

The revolution mechanism 2 includes a revolution shaft 21, a revolution driving device 23, and a support member 25. The revolution shaft 21 is axially supported by the column 13 and extends in a horizontal direction. Here, an axis of the revolution shaft 21 is defined as a first center line C1. The revolution driving device 23 rotates the revolution shaft 21 intermittently every predetermined angle about the first center line C1. As will be described later, in the present embodiment, the stirring unit 3 includes five cups 4, and the revolution driving device 23 rotates the revolution shaft 21 clockwise every 72°. In the present specification, a rotating operation about the first center line C1 is referred to as revolution. The revolution driving device 23 is a device having a first actuator that is any actuator capable of rotating the revolution shaft 21, and includes, for example, a motor and a transmission mechanism that transmits power of the motor to the revolution shaft 21. The support member 25 is fixed to the revolution shaft 21 and rotates about the revolution shaft 21. The cups 4 of the stirring unit 3 are attached to the support member 25. The support member 25 is a frame to which the cups 4 can be attached.

The stirring unit 3 stirs boiled noodles supplied thereto, mixes the boiled noodles with the mixed material, and then discharges the mixture. The stirring unit 3 includes multiple cups 4 and a self-rotation mechanism 5.

Figure 3:
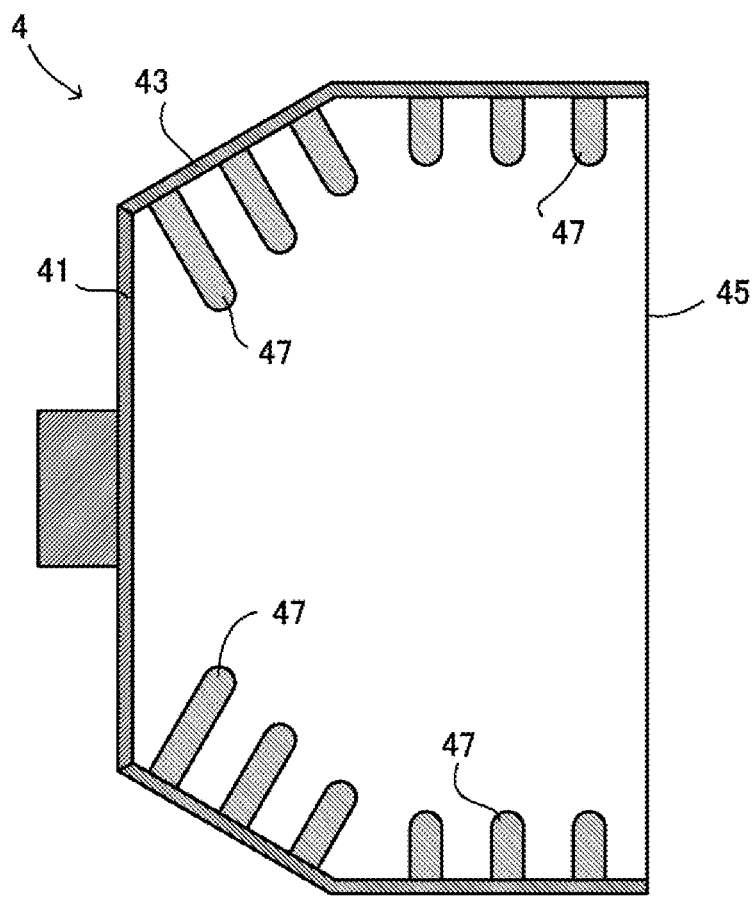
FIG. 3 illustrates an example of a cup.
Figure 4:
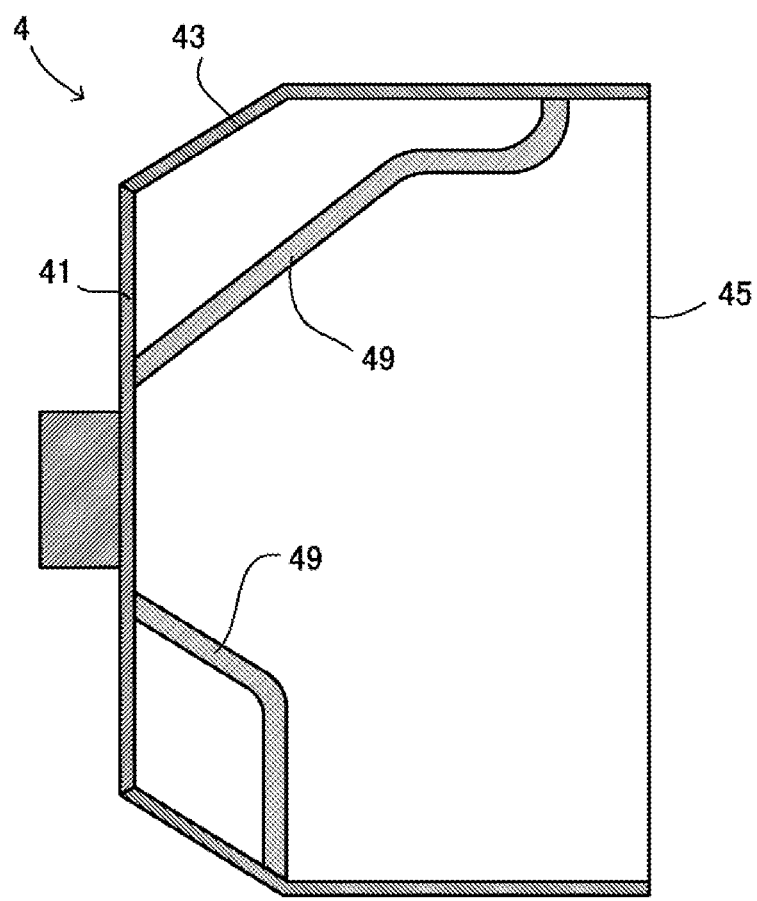
FIG. 4 illustrates an example of a cup.
Figure 5:
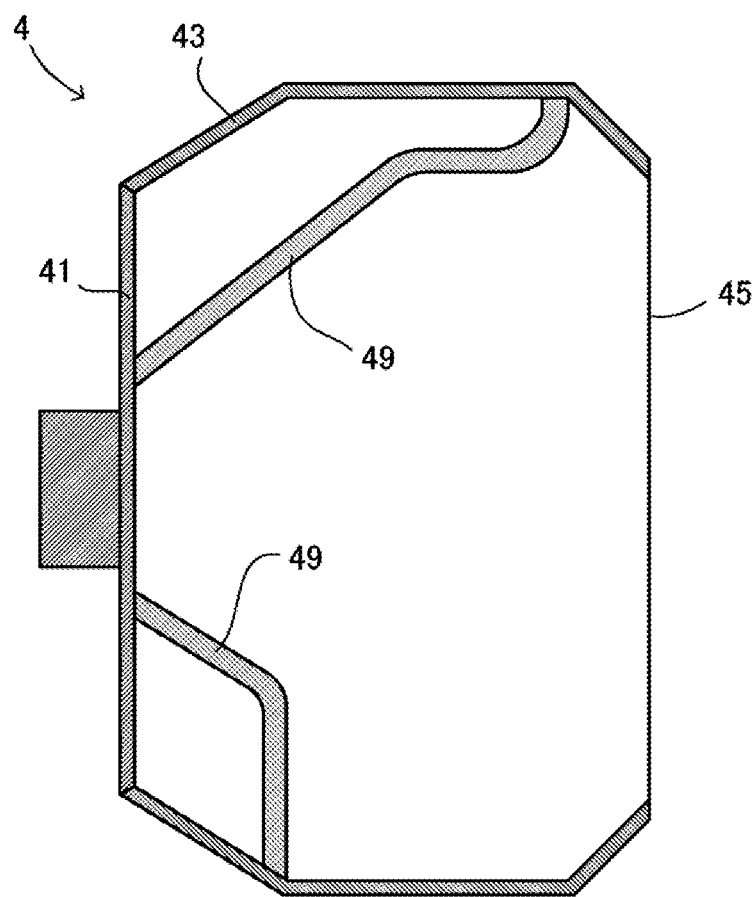
FIG. 5 illustrates an example of a cup.

The cup 4 is a container holding the boiled noodles. Specifically, the cup 4 has a bottom plate 41, a side plate 43 surrounding a periphery of the bottom plate 41, and an opening 45 formed at an upper end of the side plate 43. The cup 4 may have a simple cylindrical shape; alternatively, at least one of a portion of the side plate 43 near the bottom plate 41 and a portion of the side plate 43 near the opening 45 may be inclined inward as shown in FIG. 3 to FIG. 5. By inclining the portion of the side plate 43 near the bottom plate 41 inward, stirring performance can be improved. By inclining the portion of the side plate 43 near the opening 45 inward, the boiled noodles can be prevented from leaking from the cup 4. In order to suitably loosen the boiled noodles and efficiently mix the boiled noodles with the mixed material, inside the cup 4 there may be provided an obstacle with which the boiled noodles collide when moving. For example, a rod-shaped protrusion 47 may be provided as shown in FIG. 3, or a flat plate-shaped blade 49 may be provided as shown in FIG. 4 and FIG. 5. The multiple cups 4 are disposed evenly every predetermined angle on the circumference centered on the first center line C1 and are attached to the support member 25. In the present embodiment, the number of the cups 4 is 5, and the cups 4 are attached to the support member 25 every 72°. Here, a center line of each cup 4, that is, a line passing through the center of the bottom plate 41 and the center of the opening 45, is defined as a second center line C2. The cup 4 is rotated about the second center line C2 by the self-rotation mechanism 5. In the present specification, a rotating operation about the second center line C2 is referred to as self-rotation.

Figure 6:
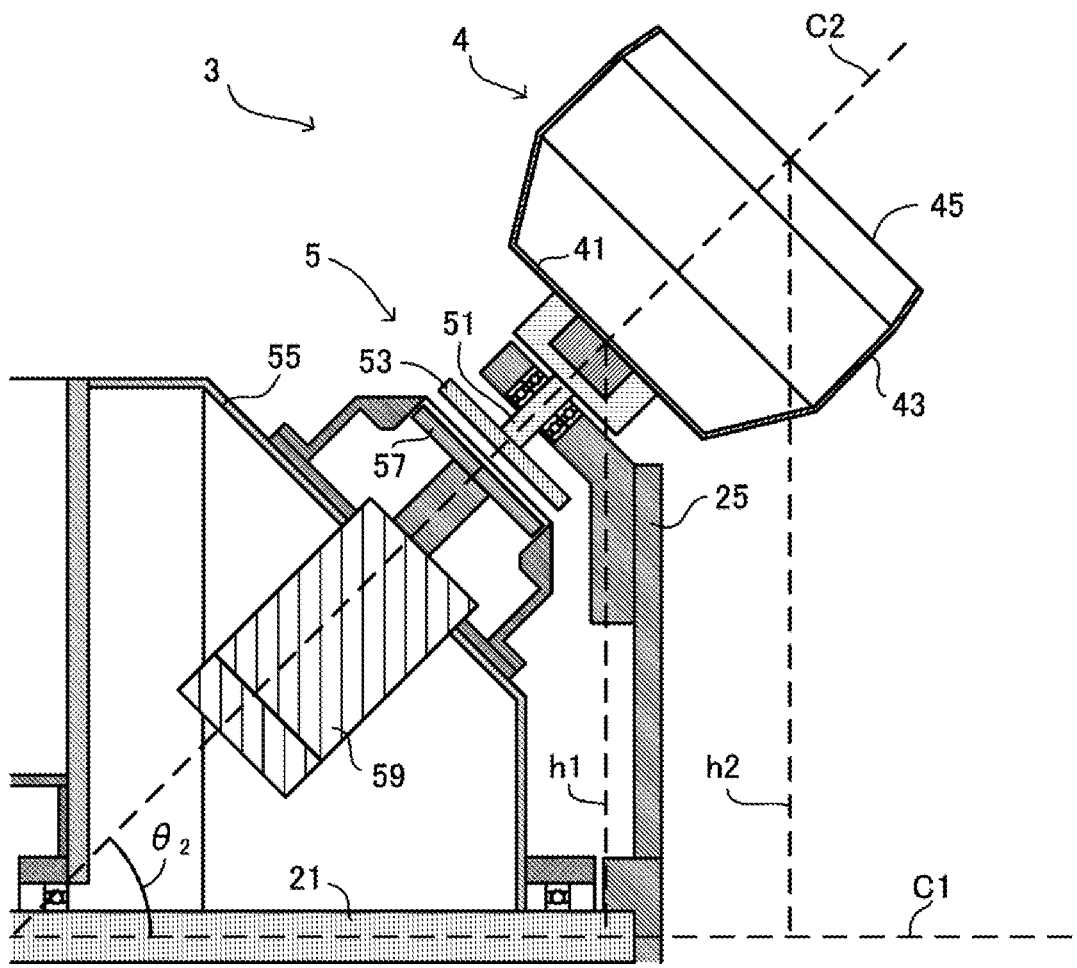
FIG. 6 is an enlarged view of a stirring unit.

As shown in FIG. 6, the self-rotation mechanism 5 includes a self-rotation shaft 51, a driven magnet 53, a bracket 55, a driving magnet 57, and a self-rotation driving device 59. Driven members, that is, the self-rotation shaft 51 and the driven magnet 53 are provided on each cup 4. Driving members, that is, the driving magnet 57 and the self-rotation driving device 59 are provided on each position where the cup 4 is self-rotated. The self-rotation shaft 51 is axially supported by the support member 25, and has one end fixed to the bottom plate 41 of the cup 4. That is, the cup 4 is attached to the support member 25 via the self-rotation shaft 51. The driven magnet 53 being a permanent magnet is provided at the other end of the self-rotation shaft 51. The bracket 55 is supported on a side of the column 13 and serves as a base on which the driving magnet 57 and the self-rotation driving device 59 are disposed. The driving magnet 57 is disposed on the bracket 55 every predetermined angle (that is, every 72° in the present embodiment). There is a correspondence between a position where the driving magnet 57 is provided and a position where the cup 4 is positioned. The driving magnet 57 is a permanent magnet and faces the driven magnet 53 with a predetermined distance therebetween. The driving magnet 57 and the driven magnet 53 constitute a magnet coupling. As the driving magnet 57 rotates, the driven magnet 53 is rotated by a magnetic force, and the cup 4 self-rotates via the self-rotation shaft 51. The self-rotation driving device 59 is disposed on the bracket 55 for each driving magnet 57. The rotation driving device 59 is a device having a second actuator that is any actuator capable of rotating the driving magnet 57, and includes, for example, a motor and a transmission mechanism that transmits power of the motor to the driving magnet 57.

Although the self-rotation mechanism 5 is not limited to the configuration described above, the self-rotation mechanism 5 like this is highly waterproof and is suitable. According to the self-rotation mechanism 5 like this, since only the driven members need to be directly provided on the cup 4, load applied to the support member 25 or the revolution shaft 21 can be reduced. In addition, the cup 4 can be configured so that it can be easily removed from the device, and maintainability is improved.

A position of the cup 4 positioned by revolution can be expressed by an angle centered on the first center line C1. When a coordinate plane with a point on the first center line C1 as the origin is considered in a front view, an angle formed by a straight line connecting the cup 4 and the origin and the x-axis is defined as a revolution angle $\theta_1$ of the cup 4. In the present embodiment, the cup 4 is positioned where the revolution angle $\theta_1$ is 18°, 90°, 162°, 234°, or 306°. The position where the revolution angle $\theta_1$ is 162° is a feeding position where the boiled noodles are fed into the cup 4. The position where the revolution angle $\theta_1$ is 90° and 18° is a stirring position where the mixed material is fed and the boiled noodles and the mixed material undergo mixing and stirring. The position where the revolution angle $\theta_1$ is 306° is a discharge position where the boiled noodles are discharged from the cup 4. The position where the revolution angle $\theta_1$ is 234° is a cleaning position where the cup 4 undergoes cleaning. In the embodiment, two stirring positions and one cleaning position are set, but the number of the positions is not limited thereto.

Each cup 4 is disposed in an inclined manner about the first center line C1 so that the opening 45 faces outward. In other words, each cup 4 is provided in an inclined manner so that a perpendicular h1 from the center of the bottom plate 41 to the first center line C1 is shorter than a perpendicular h2 from the center of the opening 45 to the first center line C1. In this way, when the revolution angle $\theta_1$ is more than 0° and less than 180°, the opening 45 of the cup 4 faces upward; when the revolution angle $\theta_1$ is more than 180° and less than 360°, the opening 45 of the cup 4 faces downward.

Hence, when discharging the boiled noodles, it would be sufficient to position the cup 4 downward, and a mechanism for inverting the cup 4 is unnecessary. It is desirable that an inclination angle $\theta_2$ of the cup 4, that is, an angle between the first center line C1 and the second center line C2, be 40° or more and 50° or less. In the present embodiment, the inclination angle $\theta_2$ is 45°.

The supply chute 61 guides the boiled noodles to the cup 4 in the feeding position. The material nozzle 63 is provided in the vicinity of the stirring position, and the mixed material is fed into the cup 4 in the stirring position. The mixed material may also be fed into the cup 4 in the feeding position. That is, the material nozzle 63 may also be provided in the vicinity of the feeding position. The material nozzle 63 is connected to a material tank (not shown) and a pump (not shown) via an on-off valve (not shown), and is configured to be switchable between start and stop of supply of the mixed material at desired timing. The discharge chute 65 guides the boiled noodles discharged from the cup 4 to a product container or the like. As the cup 4 revolves, the opening 45 faces downward. Hence, in order to catch the boiled noodles that have fallen before reaching the discharge position, the discharge chute 65 is preferably configured to cover the opening 45 at least in a range in which the opening 45 of the cup 4 faces in the horizontal direction or downward (that is, in the present embodiment, from when the revolution angle $\theta_1$ becomes 0° (360°) to when the revolution angle $\theta_1$ becomes 306°) between the stirring position and the discharge position. The cleaning nozzle 67 is provided in the vicinity of the cleaning position, and ejects water to the cup 4 in the cleaning position for cleaning the cup 4. The cleaning nozzle 67 is connected to a fresh water source (not shown) via an on-off valve (not shown), and is configured to be switchable between start and stop of ejection of water at desired timing. Detergent may be added to the water supplied to the cleaning nozzle 67. The supply chute 61, the material nozzle 63, the discharge chute 65 and the cleaning nozzle 67 are provided in positions that do not interfere with the cup 4 during revolution of the cup 4.

The controller 7 operates the stirring apparatus for boiled noodles 1 and performs various controls. Specifically, the controller 7 drives the revolution driving device 23 and the self-rotation driving device 59 for self-rotation and revolution of the cups 4, and controls the supply of material from the material nozzle 63 and the ejection of water from the cleaning nozzle 67. The controller 7 may be configured by optionally combining hardware with software as long as desired control is achieved.

According to the stirring apparatus for boiled noodles 1 as described above, since it would be sufficient to position the cup 4 downward in order to discharge the boiled noodles, a mechanism for an inverting operation is unnecessary. Therefore, the apparatus can be provided with a relatively simple and compact configuration.

Here, described is a method for stirring boiled noodles by the stirring apparatus for boiled noodles 1 of the present embodiment described above.

First, boiled noodles are fed via the supply chute 61 into the cup 4 positioned in the feeding position. At this time, the mixed material may be fed into the cup 4 via the material nozzle 63. The cup 4 self-rotates by the self-rotation mechanism 5, and the boiled noodles and the mixed material are mixed and stirred. After a lapse of a predetermined time, the cup 4 is positioned in the first stirring position by the revolution mechanism 2.

Next, the mixed material is fed into the cup 4 via the material nozzle 63 into the cup 4 positioned in the first stirring position. The cup 4 self-rotates by the self-rotation mechanism 5, and the boiled noodles and the mixed material are mixed and stirred. After a lapse of a predetermined time, the cup 4 is positioned in the second stirring position by the revolution mechanism 2. Similarly, in the second stirring position, the mixed material is fed into the cup 4 and mixed and stirred with the boiled noodles.

Since the opening 45 of the cup 4 faces upward in the feeding position and the stirring position, the boiled noodles and the mixed material can be easily fed, and the boiled noodles and the mixed material can be stirred without spilling from the cup 4.

After the mixing and stirring in the second stirring position are ended, the cup 4 is positioned in the discharge position by the revolution mechanism 2. In the cup 4 positioned in the discharge position, the opening 45 naturally faces downward, and the boiled noodles are discharged downward. At this time, the self-rotation mechanism 5 self-rotates the cup 4 and facilitates the discharge of the boiled noodles. The discharged boiled noodles are guided by the discharge chute 65 and sent to the product container or the like.

After discharge of the boiled noodles, the cup 4 is positioned in the cleaning position by the revolution mechanism 2. In the cleaning position, water is ejected from the cleaning nozzle 67 to the cup 4 with the opening 45 facing downward, and dirt adhering to the cup 4 is washed away. At this time, the self-rotation mechanism 5 self-rotates the cup 4 so that the water is applied evenly inside the cup 4.

The cup 4 is positioned again in the feeding position, and the same processes are repeated. The above processes are performed in parallel for each position.

Figure 7:
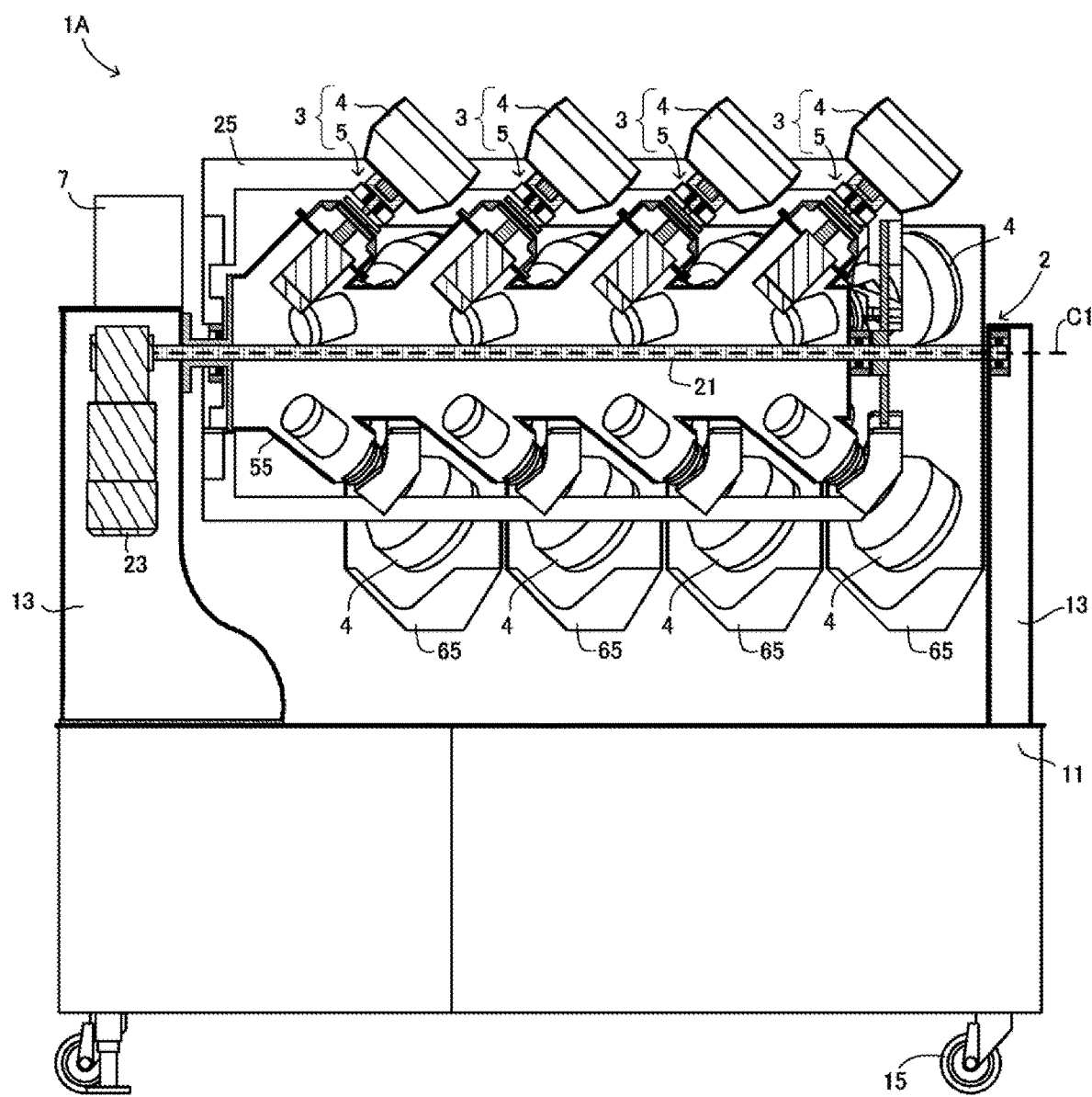
FIG. 7 is a side cross-sectional view of a stirring apparatus for boiled noodles according to a second embodiment.

Here, a second embodiment is described. FIG. 7 illustrates a stirring apparatus for boiled noodles 1A according to the second embodiment. The members equivalent to those of the first embodiment are denoted by the same reference numerals, and detailed description thereof will be omitted.

A pair of columns 13 are erected on the bed 11, and the revolution shaft 21 is rotatably supported between the columns 13. Multiple stirring units 3 are provided along the revolution shaft 21. Specifically, in the present embodiment, four stirring units 3 each including five cups 4 and self-rotation mechanisms 5 are disposed in the horizontal direction. Similarly to the first embodiment, the revolution mechanism 2 includes the revolution shaft 21, the revolution driving device 23, and the support member 25. A total of twenty cups 4 are respectively attached to the support member 25 fixed to the revolution shaft 21. That is, the cups 4 in each stirring unit 3 are simultaneously revolved by one revolution mechanism 2.

In the stirring apparatus for boiled noodles 1A of the present embodiment, since the revolution shaft 21 is provided so as to extend in the horizontal direction, it is easy to disposed multiple stirring units 3 along the revolution shaft 21, and one revolution mechanism 2 can be shared to revolve all the cups 4. Since there is no need to invert the cup 4, the stirring units 3 can be disposed at relatively small intervals, and the apparatus can be provided with a relatively compact configuration.

As having been specifically shown in several examples, the disclosure is not limited to the configurations of the embodiments shown in the drawings, and various modifications or applications are possible without departing from the technical idea of the disclosure.

What is claimed is:

1. A stirring apparatus for boiled noodles, comprising:
   a bed;

a column, erected on the bed;

a revolution shaft, axially supported by the column and extending in a horizontal direction along a horizontal axis;

a revolution driving device, having a first actuator and rotating the revolution shaft every predetermined angle about a first center line being an axis of the revolution shaft;

a support member, fixed to the revolution shaft and rotating about the revolution shaft; and at least one stirring unit, stirring and discharging boiled noodles supplied thereto, wherein the at least one stirring unit comprises:

a plurality of cups, having a bottom plate, a side plate surrounding a periphery of the bottom plate, and an opening formed at an upper end of the side plate, the plurality of cups being disposed evenly every predetermined angle on a circumference centered on the first center line, and being attached to the support member; and a self-rotation mechanism, having a second actuator and rotating each of the plurality of cups about a second center line passing through a center of the bottom plate and a center of the opening, each of the plurality of cups is provided in an inclined manner so that a perpendicular from the center of the bottom plate to the first center line is shorter than a perpendicular from the center of the opening to the first center line, during the rotation of the revolution shaft from 0° to 360°, an angle between the first center line and the second center line remains constant.

2. The stirring apparatus for boiled noodles according to claim 1, wherein the angle between the first center line and the second center line is 40° or more and 50° or less.

3. The stirring apparatus for boiled noodles according to claim 1, wherein the self-rotation mechanism comprises:

self-rotation shafts, having one end fixed to the bottom plate of the plurality of cups and axially supported by the support member;

driven magnets, being permanent magnets provided at the other end of the self-rotation shafts;

a bracket, supported by the column;

driving magnets, being permanent magnets disposed every predetermined angle on the bracket and facing the driven magnets with a predetermined distance therebetween; and self-rotation driving devices, having the second actuator and rotating the driving magnets.

4. The stirring apparatus for boiled noodles according to claim 1, wherein the at least one stirring unit comprises a plurality of stirring units, and the plurality of stirring units are disposed along the revolution shaft.

5. The stirring apparatus for boiled noodles according to claim 1, wherein cup positions where a predetermined operation is performed on each of the plurality of cups are set on the circumference every predetermined angle, and the cup positions comprise:

a feeding position where the boiled noodles are fed into a cup of the plurality of cups with the opening of said cup facing upward;

a plurality of stirring positions where a mixed material to be mixed with the boiled noodles is fed into cups of the plurality of cups, said cups are rotated about the second center line and the boiled noodles and the mixed material undergo mixing and stirring with the opening of said cups facing upward; and a discharge position where the boiled noodles are discharged from a cup of the plurality of cups with the opening of said cup facing downward.

6. The stirring apparatus for boiled noodles according to claim 5, wherein the cup positions further comprise a cleaning position where water is ejected to a cup of the plurality of cups for cleaning of said cup with the opening of said cup facing downward.

7. The stirring apparatus for boiled noodles according to claim 5, wherein in the feeding position, the boiled noodles and the mixed material are fed into said cup, said cup is rotated about the second center line, and the boiled noodles and the mixed material undergo mixing and stirring.

8. The stirring apparatus for boiled noodles according to claim 5, further comprising a discharge chute covering the opening of the plurality of cups at least in a range in which the opening faces in the horizontal direction or downward between the plurality of stirring positions and the discharge position, and guiding the boiled noodles discharged from the plurality of cups.

* * * * *